US012174380B2

(12) United States Patent
Ide

(10) Patent No.: US 12,174,380 B2
(45) Date of Patent: Dec. 24, 2024

(54) DISPLAY MODULE, ASSEMBLY METHOD FOR DISPLAY MODULE, AND VIRTUAL IMAGE DISPLAY APPARATUS

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 428 days.

(21) Appl. No.: 17/512,693

(22) Filed: Oct. 28, 2021

(65) Prior Publication Data

US 2022/0137413 A1 May 5, 2022

(30) Foreign Application Priority Data

Oct. 29, 2020 (JP) ................. 2020-181527

(51) Int. Cl.
*G02B 27/01* (2006.01)
*G02B 27/09* (2006.01)

(52) U.S. Cl.
CPC ..... *G02B 27/0172* (2013.01); *G02B 27/0955* (2013.01); *G02B 27/0983* (2013.01); *G02B 2027/011* (2013.01); *G02B 2027/0178* (2013.01)

(58) Field of Classification Search
CPC ........... G02B 27/0172; G02B 27/0955; G02B 27/0983; G02B 27/02; G02B 27/0176; G02B 27/017; G02B 27/01; G02B 27/0025; G02B 2027/011; G02B 2027/0178; G02B 2027/013; G02B 2027/0138; G02B 2027/0118; G02B 17/08; G02B 17/0856; G02B 17/0852; G02B 17/0816; G02B 17/0848; G02B 25/00; G02B 6/0011;
(Continued)

(56) References Cited

U.S. PATENT DOCUMENTS 5,625,493 A * 4/1997 Matsumura ........ G02B 27/0172
359/633
5,687,025 A 11/1997 Nanba
5,768,025 A 6/1998 Togino et al.
(Continued)

FOREIGN PATENT DOCUMENTS

JP H0772449 3/1995
JP H0943536 2/1997
(Continued)

*Primary Examiner* — Stephone B Allen
*Assistant Examiner* — Jyotsna V Dabbi
(74) *Attorney, Agent, or Firm* — JCIPRNET

(57) ABSTRACT

A display module includes a display element, a light-guiding optical system forming an exit pupil, and an optical member including a light incidence surface and a light emission surface. The light-guiding optical system is an eccentric optical system, and includes first and second incidence areas on which the image light emitted from the light emission surface is incident. The optical member is disposed, correcting an inclination of the light emission surface with respect to the light-guiding optical system such that an variation amount in an incidence angle of the image light with respect to the first incidence area, before and after the light emission surface is inclined, is greater than an variation amount in an incidence angle of the image light with respect to the second incidence area.

4 Claims, 6 Drawing Sheets

(58) Field of Classification Search
CPC ...... G02F 1/1335; G02F 1/13363; G09F 9/00; H04N 5/64
USPC .......................................................... 359/13
See application file for complete search history.

(56) References Cited

U.S. PATENT DOCUMENTS

| | | |
|---|---|---|
| 6,128,136 A | 10/2000 | Togino et al. |
| 6,181,475 B1 | 1/2001 | Togino et al. |
| 7,450,310 B2 * | 11/2008 | McGuire .............. G02B 27/144 359/630 |
| 2011/0051076 A1 * | 3/2011 | Sugihara ................ G02C 7/086 351/158 |
| 2015/0061975 A1 * | 3/2015 | Komatsu ............ G02B 27/0172 345/8 |
| 2019/0113758 A1 * | 4/2019 | Cho ..................... G03H 1/0808 |
| 2021/0063749 A1 | 3/2021 | Takeda et al. |

FOREIGN PATENT DOCUMENTS

| | | |
|---|---|---|
| JP | H0965246 | 3/1997 |
| JP | 2005017594 | 1/2005 |
| JP | 2011053367 | 3/2011 |
| JP | 2021033154 | 3/2021 |

\* cited by examiner

DISPLAY MODULE, ASSEMBLY METHOD FOR DISPLAY MODULE, AND VIRTUAL IMAGE DISPLAY APPARATUS

The present application is based on, and claims priority from JP Application Serial Number 2020-181527, filed Oct. 29, 2020, the disclosure of which is hereby incorporated by reference herein in its entirety.

BACKGROUND

1. Technical Field

The present disclosure relates to a display module, an assembly method for the display module, and a virtual image display apparatus.

2. Related Art

In recent years, various types of virtual image display apparatuses in which image light from a display element is guided by an optical element like a mirror to a pupil of a user are suggested as a virtual image display apparatus, which enables formation and observation of a virtual image, like a head-mounted display.

The eyepiece optical system described in JP 9-43536 A includes an image display, a relay optical system that intermediate images an image displayed by the image display, and an eyepiece reflective surface that guides a luminous flux from the intermediate image to the eye point. Here, the relay optical system includes a refractive optical system and a relay reflective surface. The relay reflective surface and the eyepiece reflective surface are eccentric and have an anamorphic aspherical surface shape.

In the case of a see-through type virtual image display apparatus through which the external world is visualized, it is necessary to secure an area where the external world is visible, and it is not easy to accomplish miniaturization while ensuring optical performance due to the arrangement restriction of the optical parts. In particular, when attempting to accomplish miniaturization for the head-mounted display, the apparatus may be disposed at front of the face of the user, and thus the sizes of the display element and the subsequent optical element increase. Then, the thickness before and after the optical system increases, and a part overhanging to the periphery of the eyepiece reflective surface in front of the eye, or a see-through mirror is enlarged. Because of this or the like, there may arise a high possibility that a third person will have a feeling of strangeness when viewing the user wearing the apparatus.

The apparatus of JP 9-43536 A corrects an aberration by causing the relay reflective surface or the eyepiece reflective surface to be the anamorphic aspherical surface. Unfortunately, the optical path spanning from the image display to the refractive optical system is long, and thus the miniaturization has not yet been accomplished while ensuring the resolution due to the limitation of the aberration correction using a small number of optical elements.

SUMMARY

According to one aspect of the present disclosure, there is provided a display module including a display element, a light-guiding optical system that guides image light emitted from the display element to form an exit pupil, and an optical member provided between the display element and a light-emitting portion of the light-guiding optical system, the optical member including a light incidence surface on which the image light emitted from the display element is incident and a light emission surface that emits the image light incident from the light incidence surface, in which the light-guiding optical system is an eccentric optical system, the light-guiding optical system including first and second incidence areas on which the image light emitted from the light emission surface of the optical member is incident, the optical member is disposed, correcting an inclination of the light emission surface with respect to the light-guiding optical system, an aberration on the exit pupil of the image light emitted from a predetermined position in the display element and passing through the first incidence area, when the optical member is disposed in a state where an inclination of the light emission surface is not corrected, is greater than an aberration on the exit pupil of the image light emitted from the predetermined position in the display element and passing through the second incidence area, and the optical member is disposed, correcting the inclination of the light emission surface with respect to the light-guiding optical system such that an variation amount in an incidence angle of the image light with respect to the first incidence area, before and after the light emission surface is inclined, is greater than an variation amount in an incidence angle of the image light with respect to the second incidence area.

According to the one aspect of the present disclosure, there is provided a display module including a display element, a light-guiding optical system that guides image light emitted from the display element to form an exit pupil, and an optical member that includes a light incidence surface on which the image light emitted from the display element is incident and a light emission surface that emits the image light incident from the light incidence surface toward the light-guiding optical system, in which the light-guiding optical system is an eccentric optical system, and the optical member is disposed such that the light emission surface is inclined with respect to the light-guiding optical system inclined so as to reduce an aberration on the exit pupil of the image light.

According to one aspect of the present disclosure, there is provided an assembly method for a display module, the display module including a display element, a light-guiding optical system that guides image light emitted from the display element to form an exit pupil, and an optical member that includes a light incidence surface on which the image light emitted from the display element is incident and a light emission surface that emits the image light incident on the light incidence surface toward the light-guiding optical system, the assembly method including temporarily assembling the display element, the optical member, and the light-guiding optical system to form a temporary assembly module, measuring an aberration generated on the exit pupil in the temporary assembly module, and correcting an inclination, with respect to the light-guiding optical system, of the light emission surface of the optical member, in which in correction of the inclination of the light emission surface of the optical member, the inclination of the light emission surface with respect to the light-guiding optical system is adjusted so as to reduce the aberration generated on the exit pupil in the temporary assembly module.

According to the one aspect of the present disclosure, there is provided a virtual image display apparatus including an image light generation module of the above-described aspect.

DESCRIPTION OF EXEMPLARY EMBODIMENTS

First Embodiment

An embodiment of the present disclosure is described below with reference to the accompanying drawings. Note that, in the following drawings, the measure and angle of each member are different from the actual measure and angle in order to make the size of each member substantially recognizable.

Figure 1:
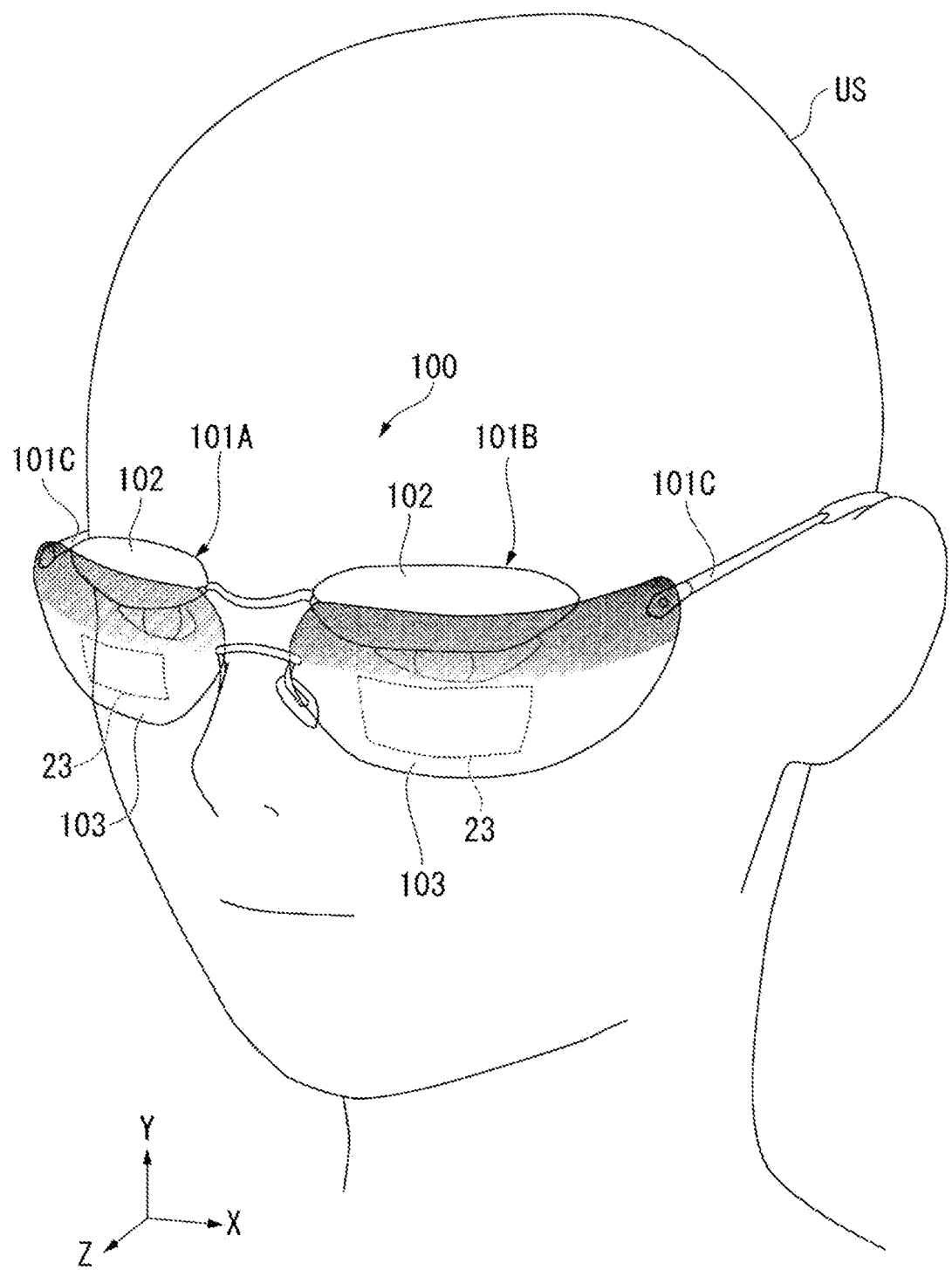
FIG. 1 is an external perspective view illustrating a state of wearing a virtual image display apparatus of the embodiment.
Figure 2:
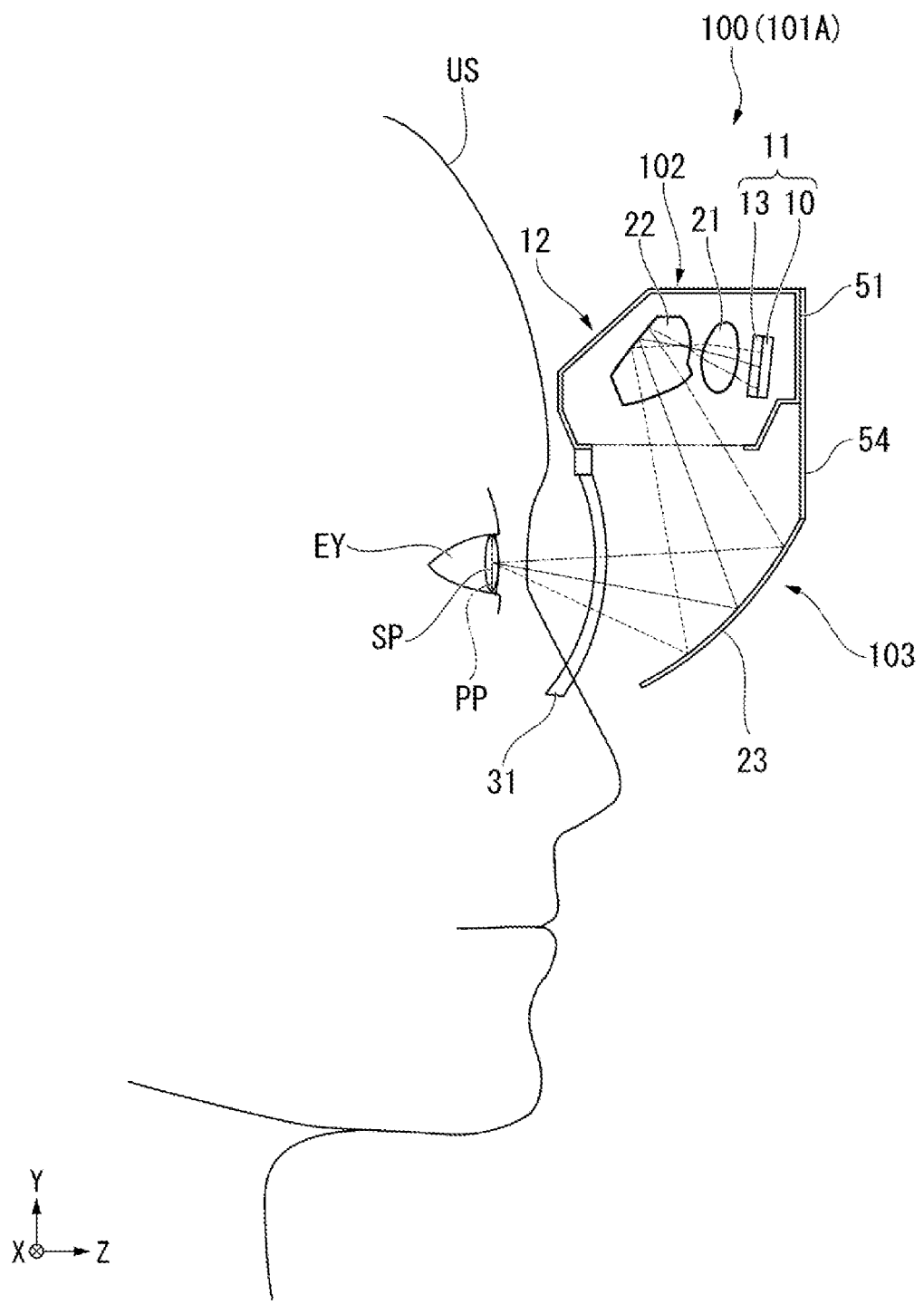
FIG. 2 is a vertical cross-sectional view of a virtual image display apparatus.
Figure 3:
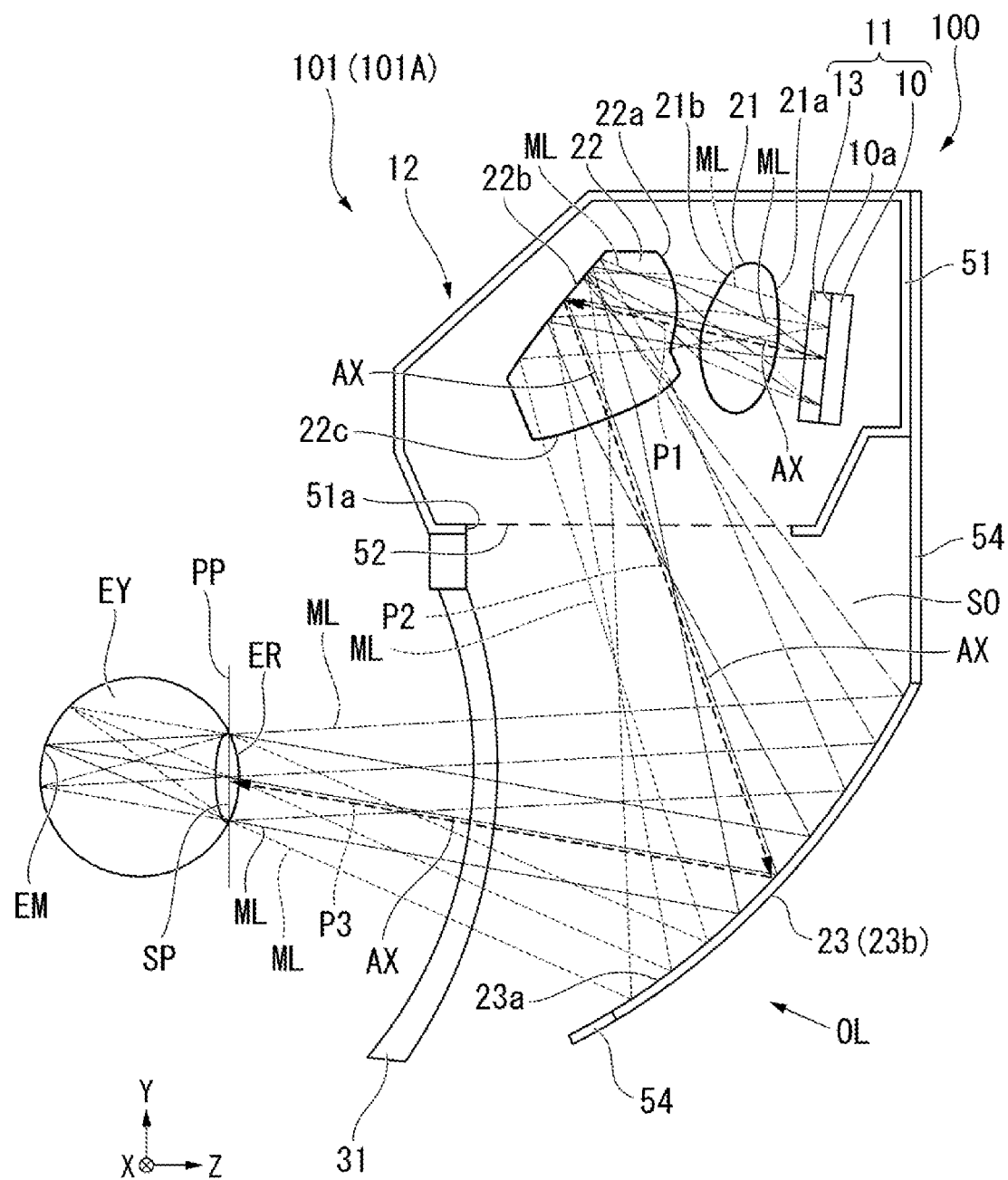
FIG. 3 is a vertical cross-sectional view illustrating an internal structure of a virtual image display apparatus.

FIG. 1 is an external perspective view illustrating a state of wearing a virtual image display apparatus of the first embodiment. FIG. 2 is a vertical cross-sectional view of the virtual image display apparatus. FIG. 3 is a vertical cross-sectional view illustrating an internal structure of the virtual image display apparatus.

A virtual image display apparatus 100 of the first embodiment is a head-mounted display (HMD) having a glass-like appearance, and causes a user or a user US wearing this apparatus to recognize videos as virtual images, as illustrated in FIGS. 1 and 2. In FIGS. 1 and 2, X, Y, and Z are an orthogonal coordinate system. A +X direction corresponds to a direction in which both eyes of the user US wearing the virtual image display apparatus 100 are aligned, and is defined as a lateral direction in this specification. A +Y direction corresponds to an upward direction orthogonal to the lateral direction of both eyes for the user US, and a +Z direction corresponds to the forward direction or the frontal direction for the user US.

The virtual image display apparatus 100 includes a first display module 101A forming a virtual image with respect to the right eye, a second display module 101B forming a virtual image with respect to the left eye, and a temple shaped support member 101C that supports the first display module 101A and the second display module 101B.

The first display module 101A includes an optical unit 102 disposed at the upper portion, and an external appearance member 103 having a glass-lens shape and covering the whole of the module. The second display module 101B includes, as in the first display module 101A, the optical unit 102 disposed at the upper portion, and the external appearance member 103 having a glass-lens shape and covering the whole of the module. The support member 101C supports the first display module 101A and the second display module 101B, by an non-illustrated member disposed at the back of the external appearance member 103, at the top end side of the external appearance member 103. The second display module 101B has the same structure as the first display module 101A, thus the first display module 101A will be described below as an example, and the description of the second display module 101B will be omitted. In the following description, the first display module 101A is simply referred to as a display module 101.

The display module 101 includes a display apparatus 11 and a light-guiding optical system 12, as illustrated in FIGS. 2 and 3.

The display apparatus 11 includes a display element 10 and an optical member 13. The light-guiding optical system 12 may also be referred to as a light-guiding optical system in view of guiding image light ML emitted from the display apparatus 11 to a pupil position PP. The light-guiding optical system 12 includes a projection lens 21, a prism 22, and a see-through mirror 23.

The display element 10 of the display apparatus 11 is constituted by a self-luminous display device, represented by an organic electroluminescence (EL) element, an inorganic EL element, a light-emitting diode (LED) array, an organic LED, a laser array, a quantum dot light-emitting element, and the like, for example. The display element 10 forms a still color image or a moving color image on an image light emission surface 10a in two-dimension. The display apparatus 11 is driven by a non-illustrated drive control circuit to perform a display operation.

When an organic EL display or a display is used as the display element 10, the display element 10 is configured to include an organic EL control unit. When a quantum dot light-emitting display is used as the display element 10, the display element 10 is configured to emit green or red color light by causing a quantum dot film to be irradiated with light from a blue light-emitting diode (LED). The display element 10 may also be, without being limited to a self-luminous display element, constituted by a liquid crystal display (LCD) or the other light modulation element. The display element 10 may be an element that causes the light modulation element to be illuminated with a light source such as a backlight to form an image. A liquid crystal on silicon (LCOS, where LCOS is a trade name), a digital micromirror device, and the like may be used, in place of the LCD, for the display apparatus 11.

The optical member 13 is provided between the display element 10 and a light-emitting portion of the light-guiding optical system 12. In the first embodiment, the optical member 13 is affixed to the image light emission surface 10a of the display element 10. That is, the optical member 13 is provided at the display element 10. The display element 10 also functions as a cover member for protecting the image light emission surface 10a of the display element 10. Note that, in the first embodiment, the light-emitting portion of the light-guiding optical system 12 corresponds to a reflective surface 23a of the see-through mirror 23.

The projection lens 21 collects the image light ML emitted from the display apparatus 11 into a state close to a parallel luminous flux, as illustrated in FIG. 3. The projection lens 21 is a single lens in the illustrated example, and includes an incidence surface 21a and an emission surface 21b. Note that the projection lens 21 may also be constituted by multiple lenses.

The prism 22 includes an incidence surface 22a, an inner reflective surface 22b, and an emission surface 22c. The prism 22 causes the image light ML emitted from the projection lens 21 to be incident while refracting the image light ML at the incidence surface 22a to be totally reflected by the inner reflective surface 22b, and to be emitted while refracting the image light ML from the emission surface 22c. The see-through mirror 23 reflects the image light ML emitted from the prism 22 toward the pupil position PP to form an exit pupil SP. The position at which the exit pupil SP is formed is referred to as the pupil position PP. Rays of image light from the points on the image light emission surface 10a are incident on the pupil position PP in a manner being superimposed, in a predetermined divergent state or a parallel state, in an angular direction corresponding to the positions of the points on the image light emission surface 10a. The image light is imaged on a retina EM of an eye EY. In the light-guiding optical system 12 of the first embodiment, the field of view (FOV) is 44 degrees, for example. The display area of the virtual image by the light-guiding optical system 12 is in a rectangular shape, and the above-described 44 degrees is an angle in the diagonal direction.

The projection lens 21 and the prism 22 are housed in a case 51 together with the display apparatus 11. The case 51 is formed of a light-shielding material, and includes a non-illustrated drive circuit that causes the display apparatus 11 to operate. The case 51 includes an aperture 51a, and the aperture 51a has a size that causes the image light ML traveling from the prism 22 toward the see-through mirror 23 to avoid interference with the case 51. The aperture 51a of the case 51 is covered by a protective cover 52 having light-transmissivity. The protective cover 52 is formed of a material such as a resin that does not have optical power and causes the image light ML to pass without being attenuated. The protective cover 52 can cause the storage space inside the case 51 to be in a sealed state, and can enhance functions such as dust prevention, anti-exposure, and prevention of contact with an optical surface. The see-through mirror 23 is supported, via a support plate 54, by the case 51. The case 51 or the support plate 54 is supported by the support member 101C illustrated in FIG. 1, and the support plate 54 and the see-through mirror 23 constitute the external appearance member 103.

The light-guiding optical system 12 of the first embodiment is constituted by an off-axis optical system, and the projection lens 21, the prism 22, and the see-through mirror 23 are arranged to form the off-axis optical system. Here, the off-axis optical system refers to a system in which the optical path bends as a whole, at the projection lens 21, the prism 22, and the see-through mirror 23 that constitute the light-guiding optical system 12, before and after light rays are incident on at least one reflective surface or refractive surface. That is, in the light-guiding optical system 12 that is an off-axis optical system, the optical axis AX is bent such that the optical axis AX extends along an off-axis surface SO corresponding to the plane of paper.

That is, in the light-guiding optical system 12 of the first embodiment, the optical axis AX is bent within the off-axis surface SO to align the projection lens 21, the prism 22, and the see-through mirror 23 along the off-axis surface SO. The off-axis surface SO is a surface that causes asymmetry in multiple stages in the off-axis optical system. In this specification, the optical axis AX extends along the optical path of the principal light ray emitted from the center of the display apparatus 11, where the optical axis AX is defined as an axis passing through the center of an eye ring ER or a pupil corresponding to the eye point. That is, the off-axis surface SO at which the optical axis AX is disposed is parallel to a YZ plane, and passes through the center of the display apparatus 11 and the center of the eye ring ER corresponding to the eye point. The optical axis AX is disposed in a Z shape when viewed in the lateral cross section. That is, in the off-axis surface SO, an optical path P1 from the projection lens 21 to the inner reflective surface 22b, an optical path P2 from the inner reflective surface 22b to the see-through mirror 23, and an optical path P3 from the see-through mirror 23 to the pupil position PP are arranged being folded back twice in a Z shape.

In the light-guiding optical system 12, the optical path P1 from the projection lens 21 to the inner reflective surface 22b is disposed being inclined so as to be directed upward as approaching, in the frontal direction (a Z direction), from the side of the display apparatus 11 toward the side of the prism 22. Here, the frontal direction refers to a visual line direction when the eyes of the user face right frontward. That is, in the optical path P1, the optical axis AX extends substantially parallel to the Z direction or the frontal direction. The projection lens 21 is disposed, with respect to the Z direction or the frontal direction, at a position interposed between the prism 22 and the display apparatus 11. In this case, the optical path P1 spanning from the prism 22 to the display apparatus 11 is inclined such that the prism 22 is on the upper side, as described above. It is desired for the orientation of the optical axis AX in the optical path P1 to be within a range of approximately from −30 degrees to +30 degrees on average, provided that, along the Z direction, the downwardness is the negative and the upwardness is the positive. It is possible, by setting the optical axis AX of the optical path P1 in a state of being downward at not less than −30 degrees toward the Z direction, to avoid the interference of the projection lens 21 or the display apparatus 11 with the see-through mirror 23. It is also possible, by setting the optical axis AX of the optical path P1 in a state of being upward at +30 degrees or less toward the Z direction, to suppress the projection lens 21 and the display apparatus 11 from protruding upward to become visually conspicuous.

It is desired for the optical axis AX, in the optical path P2 from the inner reflective surface 22b to the see-through mirror 23, to be within a range of approximately −70 degrees to −45 degrees on average, provided that, along the Z direction, the downwardness is the negative and the upwardness is the positive. It is possible, by setting the optical axis AX of the optical path P2 in a state of being downward at not less than −70 degrees toward the Z direction, to secure a space in which an inner lens 31 is disposed between the see-through mirror 23 and the pupil position PP, and to avoid overly increasing the overall inclination of the see-through mirror 23. It is also possible, by setting the optical axis AX of the optical path P2 in a state of being downward at −45 degrees or less toward the Z direction, to avoid the prism 22 from being disposed excessively protruding in a −Z direction or the back direction with respect to the see-through mirror 23, which makes it possible to avoid an increase in the thickness of the light-guiding optical system 12.

The optical path P3 from the see-through mirror 23 to the pupil position PP is disposed being inclined so as to be directed upward as approaching, in the direction (the Z direction), from the side of the see-through mirror 23 toward the side of the eye EY. In the illustrated example, the optical axis AX is at approximately −10 degrees, provided that, along the Z direction, the downwardness is the negative. This is because the human visual line is stabilized in a state where the eyes slightly downcast approximately 10 degrees inclined downward from the horizontal direction.

Note that, in the virtual image display apparatus 100 of the first embodiment, the central axis in the horizontal direction with respect to the pupil position PP is set assuming the case where the user US wearing the virtual image display apparatus 100 relaxes in an upright posture and gazes, facing the front, the horizontal direction or the horizontal line. Although the shape and posture of the head are various, which includes the arrangement of the eyes, the arrangement of the ears, and the like of an individual user US wearing the virtual image display apparatus 100, it is possible, by assuming the head shape or head posture on average of the user US, to set a central axis on average for the virtual image display apparatus 100 to which attention is paid. In the case of the virtual image display apparatus 100 of the first embodiment, the reflection angle of light rays along the optical axis AX is supposed to range approximately from 10 degrees to 60 degrees in the inner reflective surface 22b of the prism 22. Also, in the see-through mirror 23, the reflection angle of the light rays along the optical axis AX is supposed to range approximately from 20 degrees to 45 degrees.

With respect to the optical path P2 and the optical path P3 of the principal light ray, a first distance between the see-through mirror 23 and the prism 22 is set to be not greater than a second distance between the see-through mirror 23 and the pupil position PP. In this case, it is possible to suppress the protrusion amount that the prism 22 protrudes to the periphery of the see-through mirror 23, that is, upward. Here, the first distance and the second distance are designated as distances along the optical axis AX. In the case where other optical elements are added onto the optical paths P2 and P3 inside the see-through mirror 23, it is sufficient for the values of the first distance and the second distance to be determined by converting the added optical elements into an optical path length or optical distance.

In the light-guiding optical system 12 of the first embodiment, it is desired, with respect to the Y direction, for the position of the light rays passing through the most upper side in the vertical direction to be 30 mm or less with reference to the center of the pupil position PP. It is possible, by causing the light rays to be within such a range, to avoid the projection lens 21 or the display apparatus 11 from being disposed protruding in the upward direction or the +Y direction. This makes it possible to suppress the amount of the projection lens 21 or the display apparatus 11 overhanging upward from the eyebrows, which ensures design quality. That is, the optical unit 102 including the display apparatus 11, the projection lens 21, and the prism 22 can be miniaturized.

Also, in the light-guiding optical system 12 of the first embodiment, with respect to the frontal direction or the Z direction, the positions, spanning from the see-through mirror 23 to the display apparatus 11, of the whole light rays are set to 13 mm or greater with reference to the pupil position PP. It is possible, by causing the light rays to be within such a range, to dispose particularly the see-through mirror 23 so as to be sufficiently separated in the frontal direction or the +Z direction from the pupil position PP. This facilitates to secure a space in which the inner lens 31 is disposed, on the side of the reflective surface 23a of the see-through mirror 23.

Also, in the light-guiding optical system 12 of the first embodiment, the positions, spanning from the see-through mirror 23 to the display apparatus 11, of the whole light rays are set to 40 mm or less with reference to the pupil position PP. It is possible, by causing the light rays to be within such a range, to cause particularly the see-through mirror 23 to be disposed so as not to be excessively separated in the frontal direction or the +Z direction from the pupil position PP. This facilitates to suppress the frontward protrusion of the see-through mirror 23, the display apparatus 11, and the like, which ensures design quality. As for the bottom end of the prism 22, it is disposed, in relation to the vertical direction or the Y direction, at a position of not less than 10 mm with reference to the center of the pupil position PP. This facilitates to secure a see-through view such as 20 degrees in the upward direction, for example.

In the light-guiding optical system 12 of the first embodiment, the shapes of the incidence surface 21a and the emission surface 21b that are optical surfaces constituting the projection lens 21 are within the off-axis surface SO parallel to the YZ plane and have anti-symmetry across the optical axis AX in relation to the vertical direction intersecting the optical axis AX, and have symmetry across the optical axis AX in relation to the lateral direction (an X direction).

The projection lens 21 is formed of resin or the like, and may also be formed of glass. The incidence surface 21a and the emission surface 21b of the projection lens 21 are each constituted by a free curved surface, for example. Note that the incidence surface 21a and the emission surface 21b are not limited to the free curved surface, and may also be an aspherical surface. In the projection lens 21, the aberration is reduced by causing the incidence surface 21a and the emission surface 21b to be the free curved surface or the aspherical surface. In particular, it is easy, when using the free curved surface, to reduce the aberration of the light-guiding optical system 12 that is an off-axis optical system or a non-coaxial optical system. Note that the free curved surface is a surface without an axis of rotational symmetry, where as a surface function of the free curved surface, various polynomials may be used. Also, the aspherical surface is a surface that has the axis of rotational symmetry, and is a paraboloid, or a surface other than a spherical surface, represented by a polynomial. Although detailed description is omitted, an anti-reflective film is formed on the incidence surface 21a and the emission surface 21b.

Accordingly, it is possible to partly compensate the decentration of the light-guiding optical system 12 as an off-axis optical system in the projection lens 21, which contributes to an improvement in aberrations. Also, the relative inclination between the incidence surface 21a and the emission surface 21b is used to partly compensate the chromatic aberration of the projection lens 21.

The prism 22 is a refractive/reflective optical member having a function obtained by combining a mirror and a lens. Thus, the prism 22 reflects the image light ML emitted from the projection lens 21 while refracting the image light ML. More specifically, in the prism 22, the image light ML is incident inward through the incidence surface 22a that is a refractive surface, totally reflected in a non-specular direction by the inner reflective surface 22b that is a reflective surface, and is emitted to the outside through the emission surface 22c that is a refractive surface.

The incidence surface 22a and the emission surface 22c are optical surfaces formed of curved surfaces, and contribute to an improvement in resolution compared to when only the reflective surface is used, or when the incidence surface 22a and the emission surface 22c are planar surfaces. The incidence surface 22a, the inner reflective surface 22b, and the emission surface 22c that are optical surfaces constituting the prism 22 are within the off-axis surface SO parallel to the YZ plane and have anti-symmetry across the optical axis AX in relation to the vertical direction intersecting the optical axis AX, and have symmetry across the optical axis AX in relation to the lateral direction (the X direction). The prism 22 has greater lateral width in the horizontal direction or the X direction than the vertical width in the vertical direction or the Y direction, in terms of not only the physical contour, but also the optically effective area. This makes it possible to enlarge the view angle in the lateral direction or the Y direction. Also, corresponding to the laterally large movement of the eye EY, an image can be viewed even if the visual line significantly changes in the lateral direction.

The prism 22 is formed of resin or the like, and may also be formed of glass. The refractive index of the main body of the prism 22 is set to a value such that the total reflection at the inner surface is accomplished with reference to the reflection angle of the image light ML. It is preferred for the refractive index and the Abbe number of the main body of the prism 22 to be set also in view of the relationship with the projection lens 21. In particular, it is possible, by increasing the Abbe number of the prism 22 or the projection lens 21, to reduce the chromatic dispersion.

The optical surface of the prism 22, that is, the incidence surface 22a, the inner reflective surface 22b, and the emission surface 22c are each constituted by a free curved surface, for example. Note that each of the incidence surface 22a, the inner reflective surface 22b, and the emission surface 22c is not limited to the free curved surface, and may also be an aspherical surface. In the prism 22, it is possible, by causing the incidence surface 22a, the inner reflective surface 22b, and the emission surface 22c to be a free curved surface or an aspherical surface, to reduce the aberration. In particular, it is possible, when using the free curved surface, to easily reduce the aberration of the light-guiding optical system 12 that is an off-axis optical system or a non-coaxial optical system, which ensures an improvement in resolution. The inner reflective surface 22b is not limited to a reflective surface that reflects by total reflection the image light ML, and may also be a reflective surface formed of a metal film or a dielectric multilayer film. In this case, a reflective film formed of a single layer film or a multilayer film formed of a metal such as Al and Ag, for example, is deposited on the inner reflective surface 22b by vapor deposition or the like, or a sheet-shaped reflective film formed of a metal is affixed onto the inner reflective surface 22b. Although detailed description is omitted, an anti-reflective film is formed on the incidence surface 22a and the emission surface 22c.

The prism 22 is collectively formed by forming by injection molding the incidence surface 22a, the inner reflective surface 22b, and the emission surface 22c, which reduces the number of parts and increases the accuracy as to the mutual positions of the three surfaces, for example, at a level such as 20 μm or less at a relatively low cost.

The see-through mirror 23 is a plate-like optical member that functions as a concave surface mirror, and reflects the image light ML emitted from the prism 22. The see-through mirror 23 has a concave shape as viewed from the pupil position PP together with covering the pupil position PP at which the eye EY or the pupil is disposed. The see-through mirror 23 has a structure in which the reflective surface 23a composed of a mirror film is formed on one surface of a plate-like body 23b.

The shape of the reflective surface 23a of the see-through mirror 23 is within the off-axis surface SO parallel to the YZ plane and has anti-symmetry across the optical axis AX in relation to the vertical direction intersecting the optical axis AX, and has symmetry across the optical axis AX in relation to the lateral direction or the X direction. The reflective surface 23a of the see-through mirror 23 is constituted by a free curved surface, for example. Note that the reflective surface 23a is not limited to the free curved surface, and may also be an aspherical surface. The aberration is reduced by causing the see-through mirror 23 to be the free curved surface or the aspherical surface. In particular, it is easy, when using the free curved surface, to reduce the aberration of the light-guiding optical system 12 that is an off-axis optical system or a non-coaxial optical system.

The see-through mirror 23 has a shape in which the original point of the curved surface is shifted toward the side of the projection lens 21 or the side of the display apparatus 11 from the effective area of the see-through mirror 23, in either case that the reflective surface 23a is the free curved surface or the aspherical surface. In this case, it is possible to design the inclined surface of the see-through mirror that materializes a Z shaped optical path without causing excessive burden on the design of the optical system.

The see-through mirror 23 is a transmissive reflective element that reflects a part of light incident on the see-through mirror 23, and transmits the other part of light. Thus, the reflective surface 23a of the see-through mirror 23 has semi-transmissivity. Accordingly, external light OL passes through the see-through mirror 23 to thus enable see-through view of the external world, which causes the user to view a state where a virtual image is superimposed on an external image.

At this time, it is possible, by causing the plate-like body 23b to have a thin thickness of not greater than approximately several millimeters, to minimize a change in magnification ratio of the external image. It is desired for the reflectance of the reflective surface 23a with respect to the image light ML and the external light OL to be set to 10% or greater and 50% or less in the range of the incidence angle of the assumed image light ML in terms of securing the luminance of the image light ML or facilitating the observation by see-through of the external image.

The plate-like body 23b that is the base material of the see-through mirror 23 is formed of resin or the like, and may also be formed of glass. The plate-like body 23b is formed of the same material as the support plate 54 that supports the plate-like body 23b from the periphery, and has the same thickness as the support plate 54. The reflective surface 23a is formed of a dielectric multilayer film composed of multiple dielectric layers in which a film thickness is adjusted, for example. The reflective surface 23a may also be a single layer film or a multilayer film of metal such as Al and Ag in which a film thickness is adjusted. The reflective surface 23a can be formed by layering the above-described films, and may also be formed by affixing a sheet-shaped reflective film thereto.

As described above, in the light-guiding optical system 12 of the first embodiment, the surface shape of the incidence or emission surface of the projection lens 21, the prism 22, and the see-through mirror 23 is devised in order to reduce the aberration occurring when employing an eccentric optical system. However, in the display module 101 of the first embodiment, a minimum necessary configuration is used, which includes the projection lens 21, the prism 22, the see-through mirror 23 and the like in order to prioritize the miniaturization of the optical unit 102, which causes a restriction on a correctable aberration when merely devising the surface shape.

In view of the above, in the display module 101 of the first embodiment, the aberration depending on the light-guiding optical system 12 is further reduced by correcting the inclination of a light emission surface 13b of the optical member 13 with respect to the light-guiding optical system 12.

Here, a concept of reducing the aberration depending on the light-guiding optical system 12 in the display module 101 of the first embodiment will be described. A configuration, as a comparative example, in which the inclination of the light emission surface 13b of the optical member 13 is not corrected with respect to the light-guiding optical system 12 will be described below while comparing differences from the configuration of the first embodiment.

Figure 4:
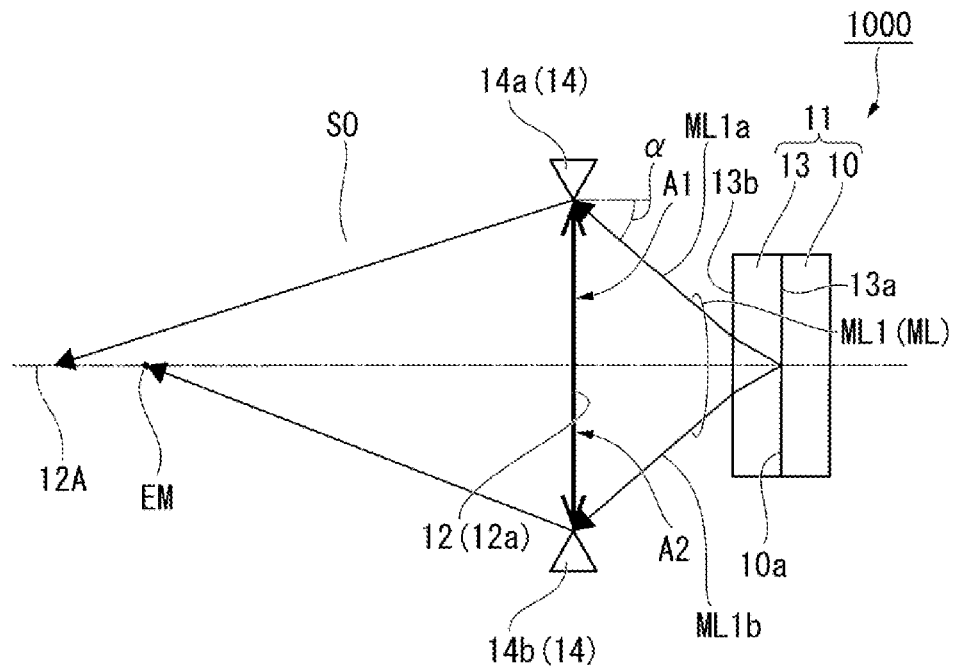
FIG. 4 is a diagram illustrating a state of occurrence of an aberration in a display module of the comparative example.
Figure 5:
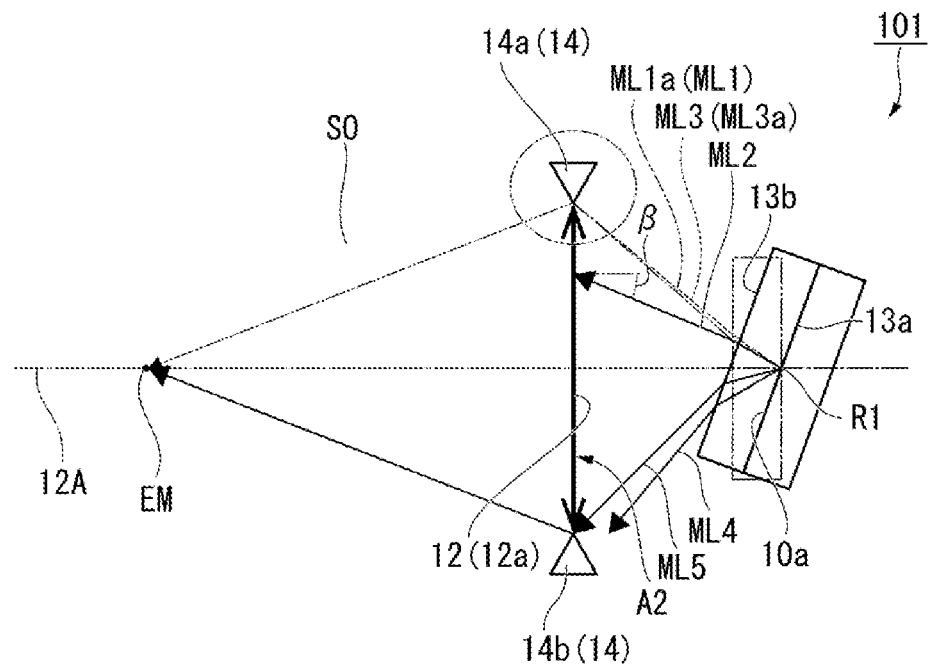
FIG. 5 is a diagram illustrating a state of occurrence of an aberration in a display module of the embodiment.

FIG. 4 is a diagram illustrating a state of occurrence of the aberration in a display module 1000 of the comparative example in which the inclination of the light emission surface 13*b* of the optical member 13 is not corrected with respect to the light-guiding optical system 12. FIG. 5 is a diagram illustrating a state of occurrence of the aberration in the display module 101 of the first embodiment in which the inclination of the light emission surface 13*b* of the optical member 13 is corrected with respect to the light-guiding optical system 12. Note that, in FIGS. 4 and 5, in order to simplify the description, the light-guiding optical system 12 is illustrated by one lens within the off-axis surface SO and the incidence surface of the lens on which the image light is incident is illustrated by a double directional arrow.

As illustrated in FIGS. 4 and 5, the optical member 13 affixed to the image light emission surface 10*a* of the display element 10 is constituted by parallel plates. The optical member 13 includes a light incidence surface 13*a* and the light emission surface 13*b*. The optical member 13 is affixed to the image light emission surface 10*a* of the display element 10 at the light incidence surface 13*a*. The light incidence surface 13*a* and the light emission surface 13*b* are parallel to each other. The light incidence surface 13*a* causes the image light ML emitted from the image light emission surface 10*a* to enter the optical member 13. The light emission surface 13*b* causes the image light ML entering, from the light incidence surface 13*a*, the optical member 13 to be emitted.

In the display module 1000 of the comparative example illustrated in FIG. 4, the optical member 13 is disposed at a reference position. Here, the reference position of the optical member 13 corresponds to the position of the optical member 13 in a state where, when the display module 1000 is assembled, the inclination of the light emission surface 13*b* is not corrected with respect to the light-guiding optical system 12. Note that the reference position of the optical member 13 is not unambiguously determined, where the position may more or less vary depending on the assembly tolerances when the display module 1000 is assembled.

In contrast, in the display module 101 of the first embodiment illustrated in FIG. 5, the optical member 13 is disposed at a correction position. Here, the correction position of the optical member 13 corresponds to the position of the optical member 13 after correcting the inclination of the optical member 13 with respect to the light-guiding optical system 12. That is, it can be said in other words that the optical member 13 before changing the inclination was disposed at the correction position, provided that, when changing the inclination of the optical member 13 disposed at the correction position, the aberration on the exit pupil SP depending on the light-guiding optical system 12 is more deteriorated than before changing the inclination.

As illustrated in FIGS. 4 and 5, the image light ML emitted from the display apparatus 11 enter, from the light incidence surface 13*a* of the optical member 13, the optical member 13, and is refracted by the light emission surface 13*b* to be emitted from the display apparatus 11 toward an incidence surface 12*a* of the light-guiding optical system 12. In FIGS. 4 and 5, for convenience of explanation, a diaphragm 14 is disposed near the incidence surface 12*a* of the light-guiding optical system 12, and an actual position of the diaphragm 14 is not specifically limited. In the following, when describing the arrangement relationship of each of the members in FIGS. 4 and 5, the upwardness in the drawings may be referred to as an upper side, and the downwardness in the drawings may be referred to as a lower side, as a matter of convenience.

The image light ML is emitted from the image light emission surface 10*a* of the display element 10 in a state having a predetermined flare spread. Note that, in FIGS. 4 and 5, light emitted from a predetermined position in the image light emission surface 10*a* of the display element 10, for example, one pixel provided at the center of a plurality of pixels is indicated, as an example of the image light ML.

The image light ML, which has Lambertian light emission characteristics, is incident on the incidence surface 12*a* of the light-guiding optical system 12 in a state having an angular distribution. Accordingly, a part of the image light ML is blocked by the diaphragm 14 of the light-guiding optical system 12, and is prevented from being emitted from the light-guiding optical system 12. In contrast, the other part of the image light ML, which is incident on the incidence surface 12*a* of the light-guiding optical system 12 without being blocked by the diaphragm 14, is emitted from the light-guiding optical system 12 to form the exit pupil SP at the pupil position PP. Note that the diaphragm 14 includes an upper side diaphragm 14*a* and a lower side diaphragm 14*b*.

In the following, some constituents of the image light ML passing through the light-guiding optical system 12 to form the exit pupil SP are referred to as image light ML1.

The incidence surface 12*a* of the light-guiding optical system 12 includes a first incidence area A1 and a second incidence area A2. The first incidence area A1 and the second incidence area A2 are disposed side by side in a direction intersecting an optical axis 12A of the light-guiding optical system 12, which is virtually indicated. The first incidence area A1 is located at the upper side of the optical axis 12A of the light-guiding optical system 12, and the second incidence area A2 is located at the lower side of the optical axis 12A of the light-guiding optical system 12. Note that, in the case of the light-guiding optical system 12 of the first embodiment, the incidence surface 12*a* corresponds to the incidence surface 21*a* of the projection lens 21 provided most proximate to the display apparatus 11.

As illustrated in FIG. 4, in the display module 1000 of the comparative example, the aberration on the exit pupil SP of the image light ML1 passing through the first incidence area A1 is greater than the aberration on the exit pupil SP of the image light ML1 passing through the second incidence area A2.

The image light ML1 passing through the first incidence area A1 is shifted to the back side (the left side in FIG. 4) at the focus point on the retina EM of the eye EY, and the image light ML1 passing through the second incidence area A2 is in a state where the image light ML1 is focused on the retina EM (an imaging state). That is, in the display module 1000 of the comparative example, an aberration such as coma aberration or the like occurs, on the exit pupil SP, at the image light ML1.

Here, in FIG. 4, the image light ML1 passing through the uppermost side of the first incidence area A1, which is not cut by the upper side diaphragm 14*a*, is referred to as an upper limit image light ML1*a*, and the image light ML1 passing through the lowermost side, which is not cut by the lower side diaphragm 14*b*, is referred to as lower limit image light ML1*b*. Here, the angle formed by the upper limit image light ML1*a* and the optical axis 12A of the light-guiding optical system 12 is designated as α degrees.

In contrast, in the display module 101 of the first embodiment, the optical member 13 at the reference position is disposed to be inclined at a predetermined angle with respect to the incidence surface 12a of the light-guiding optical system 12, as illustrated in FIG. 5. In the case of FIG. 5, the display apparatus 11 is caused to rotate clockwise with reference to the rotation axis R1 to dispose the optical member 13 at the correction position. Note that the rotation axis R1 of the display apparatus 11 is an axis orthogonal to the off-axis surface SO and passing through the center of the image light emission surface 10a of the display element 10, for example. Note that in FIG. 5, the optical member 13 at the reference position is indicated by a chain double-dashed line.

In the case of the display apparatus 11 of the first embodiment, the display element 10 is integrally provided with the optical member 13. Accordingly, it is possible, by rotating the display apparatus 11 with reference to the rotation axis R1, to rotate the display element 10 integrally with the optical member 13. This makes it possible to cause the light emission surface 13b of the optical member 13 to be inclined at a predetermined angle with respect to the incidence surface 12a of the light-guiding optical system 12. That is, the optical member 13 of the first embodiment is disposed such that the light emission surface 13b is inclined within the off-axis surface SO. The light emission surface 13b is inclined so as to face the side of the upper side diaphragm 14a.

Here, when the light emission surface 13b is inclined being directed to the upper side diaphragm 14a, the traveling direction of the image light ML2 traveling in the same direction as the upper limit image light ML1a is taken into consideration. Here, the image light ML2 traveling inside the optical member 13 in the same direction as the upper limit image light ML1a means that, inside the optical member 13, an angle formed by the upper limit image light ML1a and the optical axis 12A is the same as an angle formed by the image light ML2 and the optical axis 12A.

The image light ML2, when the light emission surface 13b is inclined, becomes incident on the light emission surface 13b at a less incidence angle compared to the configuration of the comparative example illustrated in FIG. 4, as illustrated in FIG. 5. For example, provided that the image light ML2 is incident on the light emission surface 13b from a substantially vertical direction, the image light ML2 is emitted as-is without being refracted by the light emission surface 13b. Here, in FIG. 5, the angle formed between the upper limit image light ML1a and the optical axis 12A of the light-guiding optical system 12 is designated as β degrees.

The angle β formed by the image light ML2 and the optical axis 12A after the light emission surface 13b is inclined is less than the angle α (see FIG. 4) formed by the upper limit image light ML1a and the optical axis 12A before the light emission surface 13b is inclined, as illustrated in FIGS. 4 and 5.

That is, when the light emission surface 13b of the optical member 13 is inclined as illustrated in FIG. 5, the image light ML2 traveling in the same direction as the upper limit image light ML1a becomes incident, passing through a position separated downward from the upper side diaphragm 14a, on the first incidence area A1 of the incidence surface 12a.

In the case illustrated in FIG. 4, the light of the angle component outside from the upper limit image light ML1a is blocked by the upper side diaphragm 14a, and is thus never incident on the first incidence area A1.

In contrast, it is possible, when the light emission surface 13b is inclined clockwise as illustrated in FIG. 5, for the image light ML of the angle component outside from the image light ML2 to be incident on the first incidence area A1 without being blocked by the upper side diaphragm 14a.

In the following, when the light emission surface 13b is inclined as illustrated in FIG. 5, the image light ML of the angle component that newly becomes incident on the first incidence area A1 is referred to as image light ML3.

In the case of FIG. 5, the image light ML3 passing through the uppermost side, which is not cut by the upper side diaphragm 14a, is referred to as an upper limit image light ML3a. The upper limit image light ML3a is incident on the first incidence area A1 of the incidence surface 12a of the light-guiding optical system 12, as illustrated in FIG. 5.

Figure 6:
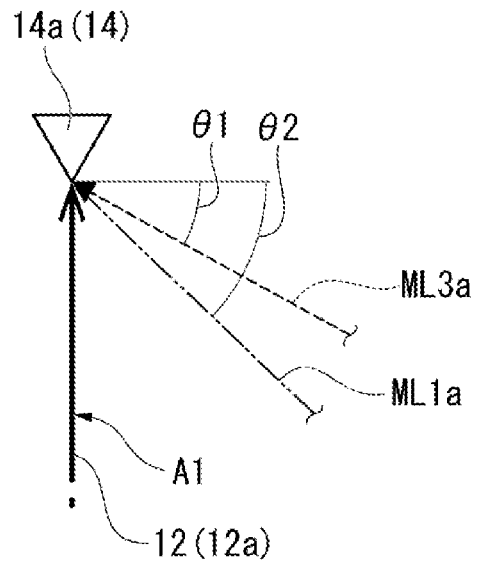
FIG. 6 is an enlarged view of a main portion indicating an incidence state with respect to an incidence surface of the light-guiding optical system.

FIG. 6 is an enlarged view of the main portion indicating an incidence state of the upper limit image light ML3a with respect to the incidence surface 12a of the light-guiding optical system 12.

The incidence angle θ1 of the upper limit image light ML3a with respect to the first incidence area A1 differs from the incidence angle θ2 of the upper limit image light ML1a with respect to the incidence surface 12a (the first incidence area A1) of the light-guiding optical system 12 before an inclination correction illustrated in FIG. 4, as illustrated in FIG. 6. In the case of FIG. 5, the incidence angle θ1 of the upper limit image light ML3a is less than the incidence angle θ2 of the upper limit image light ML1a.

Next, when the light emission surface 13b is inclined, image light ML4 traveling inside the optical member 13 in the same direction as the lower limit image light ML1b is taken into consideration.

The image light ML4, when the light emission surface 13b is inclined clockwise, becomes incident on the light emission surface 13b at a greater incidence angle compared to the configuration of the comparative example illustrated in FIG. 4, as illustrated in FIG. 5.

The image light ML4 is incident, in a more oblique direction, on the light emission surface 13b, and is refracted by the light emission surface 13b to be emitted in a direction along the light emission surface 13b. Accordingly, the image light ML4 becomes incident on the outside from the lower side diaphragm 14b.

The image light ML4, when the light emission surface 13b is inclined clockwise as such, is not incident on the second incidence area A2, and the image light ML5 having the angle component less than the image light ML4 is changed so as to be incident on the second incidence area A2. The incidence angle of the image light ML5 is approximately equal to the incidence angle of the lower limit image light ML1b.

The incidence angle of the image light ML in the first incidence area A1 significantly changes by the amount of the upper limit image light ML3a, and the incidence angle distribution of the image light ML undergoes very little change in the second incidence area A2.

That is, when the light emission surface 13b of the optical member 13 is inclined clockwise like the first embodiment, the variation amount in the incidence angle of the image light ML with respect to the first incidence area A1 of the light-guiding optical system 12, before and after the light emission surface 13b is inclined, is greater than the variation amount in the incidence angle of the image light ML with respect to the second incidence area A2.

As such, in the display module 101 of the first embodiment, it is possible, when the optical member 13 is disposed at the reference position, to increase the variation amount in the incidence angle of the image light ML caused to be incident on the first incidence area A1 where it is relatively easy to cause the aberration to occur on the exit pupil SP compared to the variation amount in the incidence angle of the image light ML caused to be incident on the second incidence area A2 where it is relatively difficult to cause the aberration to occur.

Here, the focus position of the image light ML, passing through the first incidence area A1, on the retina EM varies depending on the incidence angle of the image light ML with respect to the first incidence area A1. In the case of the first embodiment, it is possible, by reducing the incidence angle of the image light ML with respect to the first incidence area A1, to shift to the frontward side the focus position on the retina EM of the image light ML passing through the first incidence area A1.

In the light-guiding optical system 12 of the first embodiment, the constituent (the image light ML3) incident at a small incidence angle on the first incidence area A1 increases, which makes it possible to shift to the frontward side (the right side) the focus position on the retina EM of the image light ML passing through the first incidence area A1 compared to the case illustrated in FIG. 4.

In contrast, the focus position on the retina EM of the image light ML passing through the second incidence area A2 also varies, as in the first incidence area A1, depending on the incidence angle of the image light ML with respect to the second incidence area A2. In the case of the first embodiment, it is possible to reduce the variation amount in the incidence angle of the image light ML with respect to the second incidence area A2 where it is difficult to cause the aberration to occur on the exit pupil SP, which minimizes the effect on the focus position on the retina EM of the image light ML passing through the second incidence area A2.

Thus, according to the display module 101 of the first embodiment, it is possible, by inclining the light emission surface 13b of the optical member 13, to maintain an imaging state on the retina EM of the image light ML passing through the second incidence area A2 while improving the imaging state on the retina EM of the image light ML passing through the first incidence area A1. Thus, it is possible for the display module 101 of the first embodiment to improve the imaging state on the retina EM by reducing the coma aberration on the exit pupil SP of the image light ML, as illustrated in FIG. 5.

As such, in the case of the display module 101 of the first embodiment, the optical member 13 is disposed such that the light emission surface 13b is inclined with respect to the incidence surface 12a of the light-guiding optical system 12 so as to reduce the aberration on the exit pupil SP of the image light ML.

Next, the optical path of the display module 101 of the first embodiment will be described. The image light ML from the display apparatus 11 is emitted in a state of being incident on the projection lens 21 to be substantially collimated. The image light ML passing through the projection lens 21 is incident on the prism 22 and emitted while being refracted from the incidence surface 21a, and is reflected by the inner reflective surface 22b at a high reflectance approximate to 100% to be refracted again by the emission surface 22c. The image light ML from the prism 22 is incident on the see-through mirror 23 and reflected at a reflectance of approximately 50% or less by the reflective surface 23a. The image light ML reflected by the see-through mirror 23 is incident on the pupil position PP at which the eye EY or the pupil of the user US is disposed. An intermediate image is formed, between the prism 22 and the see-through mirror 23, adjacently to the emission surface 22c of the prism 22. The intermediate image is formed by appropriately enlarging an image formed on the image light emission surface 10a of the display apparatus 11. The external light OL passing through the see-through mirror 23 and the support plate 54 around the see-through mirror 23 is also incident on the pupil position PP. That is, the user US wearing the virtual image display apparatus 100 can observe, in superposition on an external image, a virtual image by the image light ML.

Next, a method for assembling the display module 101 of the first embodiment will be described.

The method for assembling the display module 101 of the first embodiment includes a temporary assembly module forming step, an aberration measuring step, and an inclination correcting step.

The temporary assembly module forming step is a step for temporarily assembling the display element 10, the optical member 13, and the light-guiding optical system 12 to form a temporary assembly module. In this step, the display apparatus 11 in which the optical member 13 is affixed to the image light emission surface 10a of the display element 10 is temporarily assembled with the light-guiding optical system 12 to assemble the temporary assembly module. Note that the positional relationship between the display apparatus 11 and the light-guiding optical system 12 in the temporary assembly module corresponds to the reference position described above.

The aberration measuring step is a step for measuring an aberration generated on the exit pupil SP in the temporary assembly module. In this step, a predetermined point of the image light emission surface 10a of the display element 10, for example, an aberration, which is formed on the exit pupil SP by the image light ML emitted from one pixel at the center of the image light emission surface 10a is measured, for example. The measurement of the aberration in the aberration measuring step may be a visual determination by the user and may be a determination using measuring equipment. Note that the aberrations may be measured, which are formed on the exit pupil SP by a plurality of the image light ML emitted from a plurality of the pixels in the image light emission surface 10a.

The inclination correcting step is a step for correcting the inclination of the light emission surface 13b of the optical member 13 with respect to the light-guiding optical system 12. In this step, the above-described aberration measuring step is repeated while changing the inclination of the light emission surface 13b of the optical member 13 with respect to the light-guiding optical system 12. Then, the variations in the aberration that occurs depending on the direction in which the light emission surface 13b of the optical member 13 is inclined are measured, and the inclination direction of the light emission surface 13b with respect to the light-guiding optical system 12 is determined when the aberration in the temporary assembly module is reduced. In this step, it is possible, by adjusting the inclination of the light emission surface 13b with respect to the light-guiding optical system 12 so as to reduce the aberration in the temporary assembly module to assemble the display module 101 of the first embodiment, where the occurrence of the aberration is reduced.

As described above, according to the virtual image display apparatus 100 of the first embodiment, it is possible to accomplish miniaturization of the optical system, and to further accomplish miniaturization of the overall size of the apparatus. It is also possible, by inclining the light emission surface 13b of the optical member 13 with respect to the optical member 13, to significantly change the incidence angle of the image light ML incident on the first incidence area A1 where a relatively large aberration is caused to occur, which makes it possible to reduce the aberration that are likely to occur in the image light ML when the apparatus configuration is miniaturized.

Thus, the virtual image display apparatus 100 of the first embodiment can be miniaturized while ensuring the resolution.

Second Embodiment

Next, the display module of the second embodiment will be described. The difference between the display module of the second embodiment and that of the first embodiment lies in the configuration of the display apparatus. Note that configurations and members common to the first embodiment will be given identical reference numerals and detail description will be omitted.

Figure 7:
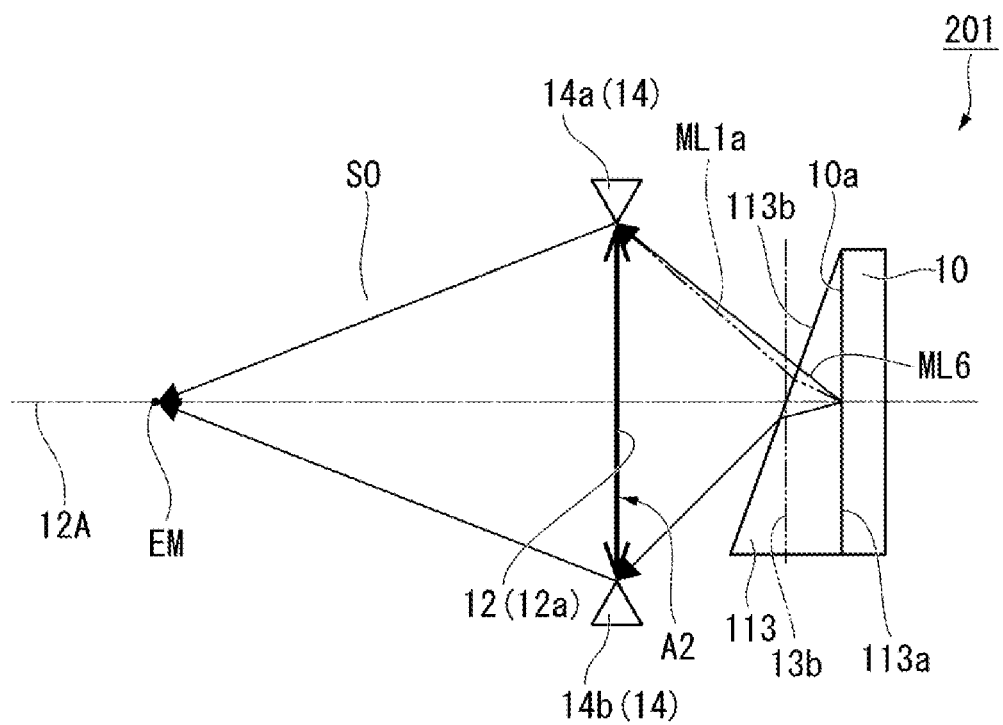
FIG. 7 is a diagram illustrating a main part of a display module of the second embodiment.

FIG. 7 is a diagram illustrating the main part of a display module 201 of the second embodiment. FIG. 7 is a diagram corresponding to FIG. 5 of the first embodiment, where illustrations of members that are not related to the description are omitted. Note that, in FIG. 7, the light emission surface 13*b* of the optical member 13 located at the reference position is indicated by a chain double-dashed line.

In the display module 101 of the first embodiment, the display apparatus 11 as-is is inclined when correcting the inclination of the optical member 13 with respect to the light-guiding optical system 12.

In contrast, in the display module 201 of the second embodiment, a configuration is employed in which a light emission surface 113*b* of an optical member 113 is inclined with respect to a light incidence surface 113*a*, as illustrated in FIG. 7. That is, in the case of the second embodiment, the light emission surface 113*b* is an inclined surface that is inclined with respect to the image light emission surface 10*a* of the display element 10.

In the display module 201 of the second embodiment, the light emission surface 113*b* of the optical member 113 is disposed at a correction position. Here, the correction position refers to a position at which the light emission surface 113*b* is inclined at a predetermined angle with respect to the light-guiding optical system 12.

In the display module 201 of the second embodiment, the inclination of the light emission surface 113*b* with respect to the incidence surface 12*a* of the light-guiding optical system 12 is the same as the light emission surface 13*b* of the first embodiment.

As described above, the Lambertian emitted image light ML from the image light emission surface 10*a* of the display element 10 has a predetermined angular distribution. Accordingly, the image light ML3, when emitted through the light emission surface 13*b* at the reference position indicated by the chain double-dashed line to be incident on the outside of the upper side diaphragm 14*a* and thus not incident on the light incidence surface 13*a* of the optical member 13, comes to be incident, without being blocked by the upper side diaphragm 14*a* due to the inclination of the light emission surface 13*b*, on the incidence surface 12*a* of the light-guiding optical system 12, as illustrated in FIG. 7. That is, according to the display module 201 of the second embodiment, it is possible, by using the optical member 113 in which only the light emission surface 113*b* is inclined, to significantly change, as in the display module 101 of the first embodiment, the incidence angle of the image light ML caused to be incident on the first incidence area A1 compared to the incidence angle of the image light ML caused to be incident on the second incidence area A2.

In the display module 201 of the second embodiment as well, it is possible to significantly change the incidence angle of the image light ML caused to be incident on the first incidence area A1 where it is easy to cause the aberration to occur on the exit pupil SP compared to the incidence angle of the image light ML caused to be incident on the second incidence area A2. Thus, in the display module 201 of the second embodiment as well, it is possible to reduce the coma aberration on the exit pupil SP of the image light ML.

Third Embodiment

Next, the display module of the third embodiment will be described. The difference between the display module of the third embodiment and that of the first embodiment or the second embodiment lies in the configuration of the display apparatus. Note that configurations and members common to the first embodiment will be given identical reference numerals and detail description will be omitted.

In the first embodiment and the second embodiment, an example is given of a case where the optical member 13 is integrally provided with the image light emission surface 10*a* of the display element 10, and the optical member 13 may also be provided between the display element 10 and the light-emitting portion of the light-guiding optical system 12. The optical member 13 may also be separately provided from the display element 10, for example.

Figure 8:
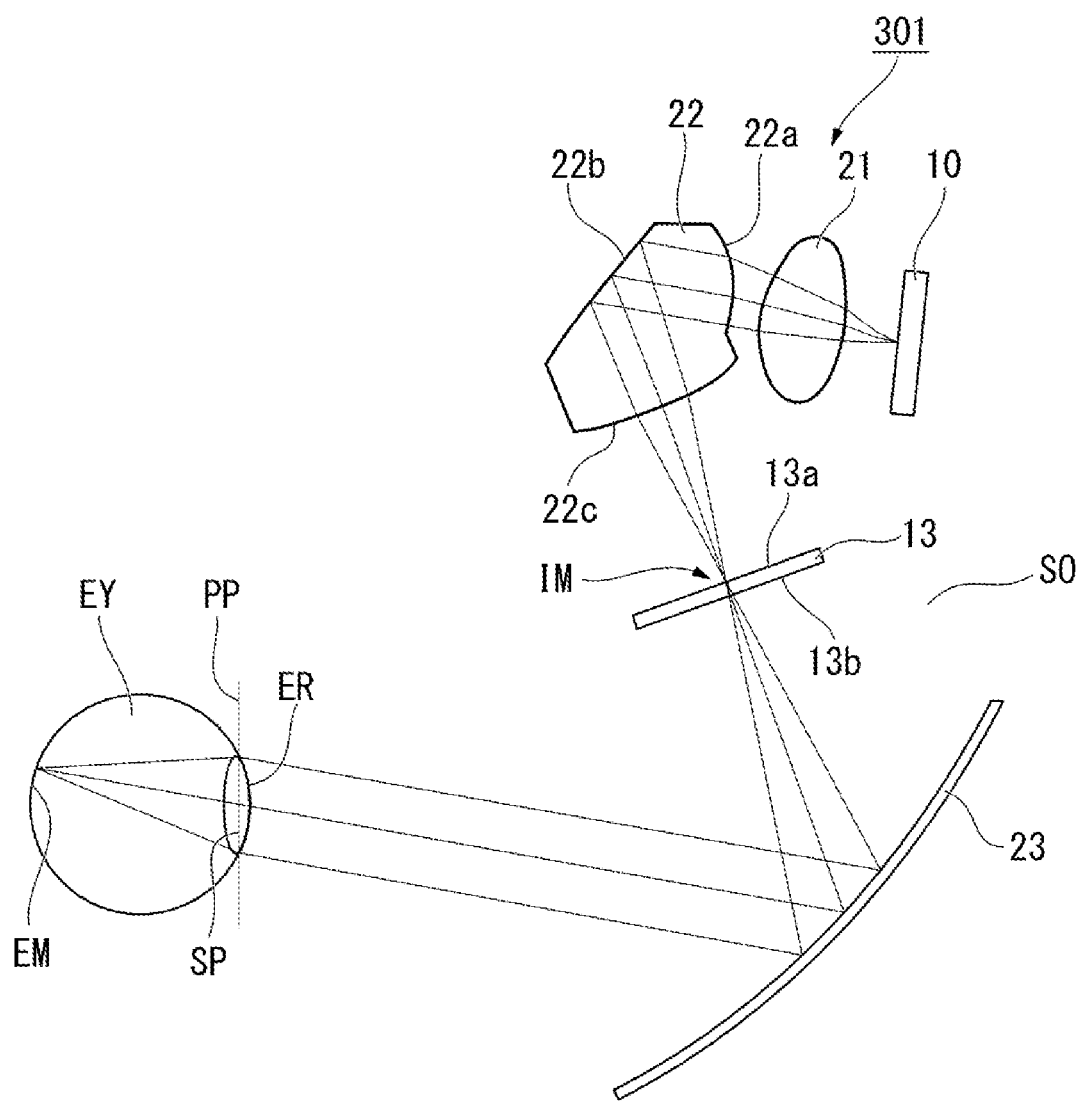
FIG. 8 is a diagram illustrating an optical path of a display module of the third embodiment.

FIG. 8 is a diagram illustrating the optical path of a display module 301 of the third embodiment. In FIG. 8, illustrations of the members that are not used in the description are omitted from the drawings.

As illustrated in FIG. 8, the display module 301 of the third embodiment includes the display element 10, the optical member 13, and the light-guiding optical system 12. That is, in the display module 301 of the third embodiment, the optical member 13 is provided at a position different from the image light emission surface 10*a* of the display element 10. In FIG. 8, only the image light ML emitted from one pixel at the center of the image light emission surface 10*a* is illustrated.

In the display module 301 of the third embodiment, an intermediate image IM is formed between the prism 22 and the see-through mirror 23. The intermediate image IM is a real image formed at a position, upstream of the optical path from the eye ring ER, conjugate to the image light emission surface 10*a*. The intermediate image IM has a pattern corresponding to a displayed image on the image light emission surface 10*a*.

In the display module 301 of the third embodiment, the optical member 13 is provided so as to cause the light incidence surface 13*a* to be disposed at a position, in the optical path of the light-guiding optical system 12, at which the intermediate image IM is formed by imaging the image light ML. According to this configuration, it is possible, because the optical member 13 can be disposed in the optical path of the image light ML of the light-guiding optical system 12, to increase the degree of freedom in the optical design of the display module 301.

Note that it is preferred for the intermediate image IM to be formed at a position closer to the prism 22 than the intermediate point between the see-through mirror 23 and the prism 22. It is possible, by forming the intermediate image IM near the prism 22 as such, to decrease the burden of enlarging the image by the see-through mirror 23, reducing the aberration of the virtual image observed. However, the intermediate image IM is not in a state of intersecting the emission surface 22*c* of the prism 22. That is, the intermediate image IM is formed outside the emission surface 22c, where this arrangement relationship is not limited to on the off-axis surface SO, and is established at any point on the emission surface 22c in the horizontal direction or the X direction that is perpendicular to the off-axis surface SO. The intermediate image IM is formed so as not to traverse the emission surface 22c of the prism 22 as such, making it easy to avoid dusts and scratches on the surface of the emission surface 22c from affecting the imaging.

Next, a method for assembling the display module 301 in the third embodiment will be described.

The method for assembling the display module 301 of the third embodiment includes the temporary assembly module forming step, the aberration measuring step, and the inclination correcting step.

In the case of the assembly method for the display module 301 of the third embodiment, it is possible, after correcting the inclination of the light emission surface 13b of the optical member 13 with respect to the light-guiding optical system 12 in the inclination correcting step, to bring back and forth the display element 10 in the optical axis direction to perform focus adjustment. That is, in the case of the display module 301 of the third embodiment, it is possible, because the optical member 13 is separately formed from the display element 10, to independently perform the inclination correction of the optical member 13 and the focus adjustment of the display element 10. Thus, according to the display module 301 of the third embodiment, it is possible to enable the user to view more superior images.

Modifications and Other Matters

The present disclosure has been described as the above based on the above-described embodiments, and the present disclosure is not limited to the above-described embodiments. The present disclosure may be carried out in various modes without departing from the gist of the present disclosure, and is also applicable to the following modifications, for example.

For example, a structure may also be employed in which the display apparatus 11 is disposed to be inclined further obliquely downward with respect to the light-guiding optical system 12 in the display module of the above-described embodiments. Employing this configuration, by disposing the display apparatus 11 to be inclined obliquely downward, makes it possible to miniaturize the shape of the case 51 illustrated in FIG. 2. It is possible, by miniaturizing the case 51 as such, to achieve weight reduction and improvement of the degree of freedom in design quality of the display module.

Note that when the display apparatus 11 is disposed to be inclined further obliquely downward with respect to the light-guiding optical system 12, the amount of eccentricity of the optical system increases. Although it becomes a situation in which the aberration easily occurs when the amount of eccentricity of the optical system is increased, an application of the present disclosure makes it possible to miniaturize the display module while ensuring the resolution because it is possible to minimize deterioration in image quality due to the aberration by adjusting the inclination of the light emission surface 13b of the optical member 13, as described above.

The present disclosure is also applicable to a light-guiding optical system having aberration characteristics contrary to the above-described embodiments in which the aberration of the image light passing through the second incidence area A2 is greater than the aberration of the image light passing through the first incidence area A1. In geometrical point of view, when the light emission surface 13b of the optical member 13 is inclined clockwise as opposed to the above-described embodiments, it is possible, because the variation amount in the incidence angle of the image light ML at the second incidence area A2, before and after the inclination of the light emission surface 13b, is greater than the variation amount in the incidence angle of the image light ML in the first incidence area A1, to reduce the aberration when using the above-described light-guiding optical system having aberration characteristics contrary to the above-described embodiments.

Also, the image light ML is Lambertian emitted from the image light emission surface 10a of the display element 10, as described above. Accordingly, even when adjusting the inclination of the light emission surface 13b, the angle component of any one of the image light ML having been Lambertian emitted from a certain pixel forms the exit pupil SP. That is, the angle component of the image light ML forming the exit pupil SP varies by the inclination of the light emission surface 13b.

In normal, the luminance peak direction of the image light ML emitted from the image light emission surface 10a is caused to coincide with the normal direction of the image light emission surface 10a. Accordingly, when the angle component of the image light ML forming the exit pupil SP varies, the image light ML of the angle component shifted from the luminance peak forms the exit pupil SP, which may cause luminance unevenness in the visible image of the user.

In contrast, in the display In contrast, in the display element 10 of the third embodiment, the luminance peak direction of the image light ML emitted from the image light emission surface 10a is inclined with respect to the normal direction of the image light emission surface 10a.

Because the image light ML has a luminance peak in the traveling direction of the principal light ray, it is possible to control the luminance peak direction of the image light ML by adjusting the emission direction of the image light ML from the image light emission surface 10a.

A method for adjusting the emission direction of the image light ML from the image light emission surface 10a is enabled by using a configuration in which a microlens array including a plurality of lenses corresponding to the pixels is provided on the image light emission surface 10a, or a configuration in which the aperture position of the color filter is shifted for each of the pixels, for example.

Note that the luminance peak direction of the image light ML may be adjusted for each of the pixels of the image light emission surface 10a, or may be adjusted as appropriate for each of a plurality of areas set on the image light emission surface 10a. Also, the adjustment of the luminance peak direction of the image light ML may be performed for some pixels of the image light emission surface 10a, for example, for specific pixels having relatively large luminance unevenness.

In the above-described embodiments, the self-luminous display device such as an organic EL element, an LCD, and the other light modulation element are used as the display element 10, which does not limit the present disclosure. For example, when employing a configuration in which the optical member 13 is separately provided as in the above-described third embodiment, it is also possible, in place of the display element 10, to apply an image forming apparatus in which a plurality of display elements are combined with a synthetic prism that synthesizes image light from the plurality of display elements, and an image forming apparatus in which a laser scanner is used in which a laser light source is combined with a scanner such as a polygon mirror.

Note that a light control device that controls light by restricting transmissive light through the see-through mirror 23 may be attached to the external world side of the see-through mirror 23. The light control device electrically adjusts transmittance, for example. A mirror liquid crystal, an electronic shade, and the like may be used as the light control device. The light control device may adjust transmittance in accordance with external light brightness. It is possible, when the light control device blocks the external light OL, to observe only a virtual image that is not affected by an external image. Also, the virtual image display apparatus of the claimed disclosure is applicable to a so-called closed-type head-mounted display apparatus (HMD) that blocks external light and causes only image light to be visually recognized. In this case, the HMD may also be compatible with a so-called see-through video product constituted by a virtual image display apparatus and an image capturing device.

Also, in the description above, the virtual image display apparatus 100 is premised to be mounted and used on a head, and the virtual image display apparatus 100 described above may also be used as a hand-held display that is not mounted on the head and is viewed into the display like binoculars. That is, the head-mounted display also includes a hand-held display in the present disclosure.

The display module of one aspect of the present disclosure may have the following configuration.

A display module of one aspect of the present disclosure, the display module including a display element, a light-guiding optical system that guides image light emitted from the display element to form an exit pupil, and an optical member provided between the display element and a light-emitting portion of the light-guiding optical system, the optical member including a light incidence surface on which the image light emitted from the display element is incident and a light emission surface that emits the image light incident from the light incidence surface, in which the light-guiding optical system is an eccentric optical system, the light-guiding optical system including first and second incidence areas on which the image light emitted from the light emission surface of the optical member is incident, the optical member is disposed, correcting an inclination of the light emission surface with respect to the light-guiding optical system, an aberration on the exit pupil of the image light emitted from a predetermined position in the display element and passing through the first incidence area, when the optical member is disposed in a state where an inclination of the light emission surface is not corrected, is greater than an aberration on the exit pupil of the image light emitted from the predetermined position in the display element and passing through the second incidence area, and the optical member is disposed, correcting the inclination of the light emission surface with respect to the light-guiding optical system such that an variation amount in an incidence angle of the image light with respect to the first incidence area, before and after the light emission surface is inclined, is greater than an variation amount in an incidence angle of the image light with respect to the second incidence area.

In the display module of one aspect of the present disclosure, the light-guiding optical system may be an off-axis optical system, and the optical member may be disposed such that the light emission surface is inclined within an off-axis surface.

In the display module of one aspect of the present disclosure, the optical member may be separately provided from the display element.

In the display module of one aspect of the present disclosure, the optical member may be provided so as to cause the light incidence surface to be disposed at a position, in the optical path of the light-guiding optical system, at which an intermediate image is formed by imaging the image light.

In the display module of one aspect of the present disclosure, the optical member may be provided at the display element.

In the display module of one aspect of the present disclosure, the light emission surface and the light incidence surface may be mutually parallel surfaces, and the optical member may be disposed to be inclined with respect to an incidence surface of the light-guiding optical system together with the display element.

In the display module of one aspect of the present disclosure, the light emission surface may be inclined with respect to the light incidence surface.

In the display module of one aspect of the present disclosure, in the display element, a luminance peak direction of the image light emitted from the predetermined position may be inclined with respect to a normal direction of the image light emission surface.

The display module of another aspect of the present disclosure may have the following configuration.

A display module of another aspect of the disclosure includes a display element, a light-guiding optical system that guides image light emitted from the display element to form an exit pupil, and an optical member that includes a light incidence surface on which the image light emitted from the display element is incident and a light emission surface that emits the image light incident from the light incidence surface, in which the light-guiding optical system is an eccentric optical system, and the optical member is disposed such that the light emission surface is inclined with respect to the light-guiding optical system so as to reduce an aberration on the exit pupil of the image light.

A method for assembling a display module of one aspect of the present disclosure may have the following configuration.

A method for assembling a display module of one aspect of the present disclosure, the display module including a display element, a light-guiding optical system that guides image light emitted from the display element to form an exit pupil, and an optical member that includes a light incidence surface on which the image light emitted from the display element is incident and a light emission surface that emits the image light incident from the light incidence surface toward the light-guiding optical system, the assembly method including temporarily assembling the display element, the optical member, and the light-guiding optical system to form a temporary assembly module, measuring an aberration generated on the exit pupil in the temporary assembly module, and correcting an inclination, with respect to the light-guiding optical system, of the light emission surface of the optical member, in which in correction of the inclination of the light emission surface of the optical member, the inclination of the light emission surface with respect to the light-guiding optical system is adjusted so as to reduce the aberration generated on the exit pupil in the temporary assembly module.

The virtual image display apparatus of one aspect of the present disclosure may have the following configuration.

The virtual image display apparatus of one aspect of the present disclosure includes an image display module of the aspect described above.

What is claimed is:

1. A display module, comprising:
   a display element emitting image light;
   an optical member provided on the display element, and the optical member including a light emission surface that emits the image light emitted from the display element; and
   a light-guiding optical system being an eccentric optical system, the light-guiding optical system including first and second incidence areas, the first incidence area being an upper area based on an axis of the light-guiding optical system, and the second incidence area being a lower area based on the axis of the light-guiding optical system, wherein
   the optical member is inclined with respect to the axis of the light-guiding optical system,
   in the optical member, a refractive angle with respect to the image light passing through the second incidence area is larger than a refractive angle with respect to the image light passing through the first incidence area, and
   a range of an incidence angle of the image light incident on the first incidence area is larger than a range of an incidence angle of the image light incident on the second incidence area,
   the optical member includes a light incidence surface on which the image light emitted from the display element is incident,
   the light emission surface and the light incidence surface are mutually parallel surfaces, and
   the optical member is disposed inclined with respect to an incidence surface of the light-guiding optical system together with the display element.

2. The display module according to claim 1, wherein
   the light-guiding optical system is an off-axis optical system, and
   the optical member is disposed such that the light emission surface is inclined within an off-axis surface.

3. The display module according to claim 1, wherein
   the optical member includes a light incidence surface on which the image light emitted from the display element is incident,
   the light emission surface is inclined with respect to the light incidence surface.

4. The display module according to claim 1, wherein
   in the display element, a luminance peak direction of the image light is inclined with respect to a normal direction of the image light emission surface.

* * * * *